(12) United States Patent
Okamoto et al.

(10) Patent No.: US 8,717,451 B2
(45) Date of Patent: May 6, 2014

(54) CAMERA SYSTEM, CAMERA BODY AND INTERCHANGEABLE LENS

(75) Inventors: Mitsuyoshi Okamoto, Osaka (JP); Kenji Kawazoe, Hyogo (JP); Naotake Kitahira, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 155 days.

(21) Appl. No.: 12/992,778

(22) PCT Filed: Apr. 22, 2009

(86) PCT No.: PCT/JP2009/001848
§ 371 (c)(1),
(2), (4) Date: Nov. 15, 2010

(87) PCT Pub. No.: WO2009/139118
PCT Pub. Date: Nov. 19, 2009

(65) Prior Publication Data
US 2011/0080488 A1    Apr. 7, 2011

Related U.S. Application Data

(60) Provisional application No. 61/053,815, filed on May 16, 2008.

(30) Foreign Application Priority Data

May 30, 2008  (JP) ................................ 2008-141929
Jun. 3, 2008   (JP) ................................ 2008-145687

(51) Int. Cl.
*H04N 5/225*    (2006.01)
(52) U.S. Cl.
USPC ...................................... 348/220.1; 396/125

(58) Field of Classification Search
USPC .............................................. 348/220.1, 347
See application file for complete search history.

(56) References Cited

U.S. PATENT DOCUMENTS 4,783,677 A    11/1988   Hamada et al.
5,255,046 A    10/1993   Kawasaki et al.
(Continued)

FOREIGN PATENT DOCUMENTS

JP    4-102835    4/1992
JP    5-236326    9/1993
(Continued)

OTHER PUBLICATIONS

Translation of International Preliminary Report on Patentability (PCT/IB/338) mailed on Dec. 16, 2010 with PCT/IPEA/409 for corresponding application PCT/JP2009/001848.
(Continued)

*Primary Examiner* — Twyler Haskins
*Assistant Examiner* — Fayez Bhuiyan
(74) *Attorney, Agent, or Firm* — Panasonic Patent Center (57) ABSTRACT

The camera body includes a synchronizing signal generator that generates a synchronizing signal, a body controller that controls the camera body and generates a command to control the interchangeable lens. The body controller performs control to send the interchangeable lens a command to set the interchangeable lens to a synchronous mode in which operation of the interchangeable lens is controlled in synchronization with the synchronizing signal and a command to set the interchangeable lens to an asynchronous mode which is a mode other than the synchronous mode. The interchangeable lens includes a lens controller that controls the operation of the interchangeable lens. The lens controller controls the operation of the interchangeable lens in the synchronous mode or the asynchronous mode according to the command received from the camera body.

7 Claims, 6 Drawing Sheets

(56) References Cited

U.S. PATENT DOCUMENTS

| | | |
|---|---|---|
| 5,387,960 A * | 2/1995 | Hirasawa et al. ............. 396/135 |
| 5,648,836 A | 7/1997 | Sato et al. |
| 6,094,223 A | 7/2000 | Kobayashi |
| 6,363,220 B1 | 3/2002 | Ide |
| 2002/0044206 A1 | 4/2002 | Kyuma et al. |
| 2002/0047912 A1 | 4/2002 | Mabuchi et al. |
| 2002/0075395 A1 * | 6/2002 | Ohkawara ..................... 348/347 |
| 2006/0066747 A1 | 3/2006 | Tsuda |
| 2007/0086778 A1 * | 4/2007 | Tanaka .......................... 396/529 |
| 2007/0140681 A1 * | 6/2007 | Tanaka .......................... 396/279 |
| 2008/0031611 A1 | 2/2008 | Konishi |
| 2008/0100730 A1 | 5/2008 | Tsuda |
| 2008/0199170 A1 * | 8/2008 | Shibuno et al. .............. 396/125 |
| 2011/0044682 A1 * | 2/2011 | Kawanami ..................... 396/439 |

FOREIGN PATENT DOCUMENTS

| | | |
|---|---|---|
| JP | 8-129199 | 5/1996 |
| JP | 2006-98736 | 4/2006 |
| JP | 2006-208897 | 8/2006 |
| JP | 2006-340237 | 12/2006 |
| JP | 2007-88575 | 4/2007 |
| JP | 2007-322922 | 12/2007 |
| JP | 2008-118239 | 5/2008 |

OTHER PUBLICATIONS

International Search Report of PCT Application No. PCT/JP2009/001848, dated Aug. 4, 2009.
The Extended European Search Report, Application No. EP 09 74 6393, dated on Oct. 7, 2011.

* cited by examiner

CAMERA SYSTEM, CAMERA BODY AND INTERCHANGEABLE LENS

TECHNICAL FIELD

The present invention relates to a camera system, and more particularly to a camera system configured by an interchangeable lens and a camera body.

BACKGROUND ART

Patent Document 1 discloses a camera system configured by a camera body and an interchangeable lens. The camera system performs autofocus control upon capturing a still image by sending an instruction to control drive of the interchangeable lens from the camera body to the interchangeable lens while synchronizing operation between the camera body and the interchangeable lens.

PRIOR-ART DOCUMENTS

Patent Documents

Patent Document 1: JP 2007-322922 A

DISCLOSURE OF INVENTION

Problems to be Solved by the Invention

As described above, the drive of the interchangeable lens is controlled while synchronizing operation between the camera body and the interchangeable lens. However, a process performed in each of the camera body and the interchangeable lens does not necessarily need to be performed while synchronizing the operation between the camera body and the interchangeable lens. The processing efficiency of a process that does not require synchronization can be rather improved when the process is processed in the camera body or the interchangeable lens in asynchronous with each other.

The present invention is made to solve the above-described problem, and an object of the present invention is therefore to provide a camera system that can perform synchronization control only when synchronization between a camera body and an interchangeable lens is required.

Means for Solving the Problems

In a first aspect, there is provided a camera system including a camera body and an interchangeable lens. The camera body includes a synchronizing signal generator that generates a synchronizing signal, a body controller that controls the camera body and generates a command to control the interchangeable lens, and a sending unit that sends the synchronizing signal and the command. The body controller performs control to send the interchangeable lens a command to set the interchangeable lens to a synchronous mode in which operation of the interchangeable lens is controlled in synchronization with the synchronizing signal and a command to set the interchangeable lens to an asynchronous mode which is a mode other than the synchronous mode. The interchangeable lens includes a receiving unit that receives a synchronizing signal and a command which are sent from the camera body, and a lens controller that controls the operation of the interchangeable lens. The lens controller controls the operation of the interchangeable lens in the synchronous mode or the asynchronous mode according to the command received from the camera body.

By the above-described configuration, switching between the synchronous mode and asynchronous mode of the interchangeable lens can be performed at any timing and thus synchronization control can be performed only when synchronization between the camera body and the interchangeable lens is required. Accordingly, during the asynchronous mode, the camera controller can concentrate on the control of the camera body and the lens controller does not suffer more restrictions than necessary to achieve synchronization with the camera body.

In a second aspect, there is provided a camera body to which an interchangeable lens is attachable. The camera body includes a synchronizing signal generator that generates a synchronizing signal, a body controller that controls the camera body and generates a command to control the interchangeable lens, and a sending unit that sends the synchronizing signal and the command. The body controller performs control to send the interchangeable lens a command to set the interchangeable lens to a synchronous mode in which operation of the interchangeable lens is controlled in synchronization with the synchronizing signal and a command to set the interchangeable lens to an asynchronous mode which is a mode other than the synchronous mode.

In a third aspect, there is provided an interchangeable lens attachable to a camera body. The interchangeable lens includes a receiving unit that receives a synchronizing signal and a command which are sent from the camera body, and a lens controller that controls operation of the interchangeable lens. The lens controller controls the operation of the interchangeable lens in the synchronous mode or the asynchronous mode, according to the command received from the camera body.

Effect of the Invention

According to the configurations of the above-described aspects, a camera system can be provided in which switching between the synchronous mode and asynchronous mode of the interchangeable lens can be performed at any timing and thus synchronization control can be performed only when synchronization between the camera body and the interchangeable lens is required.

BEST MODE FOR CARRYING OUT THE INVENTION

Preferred embodiments will be described below with reference to the accompanying drawings.

First Embodiment

1. Configuration 1-1. Overview

Figure 1:
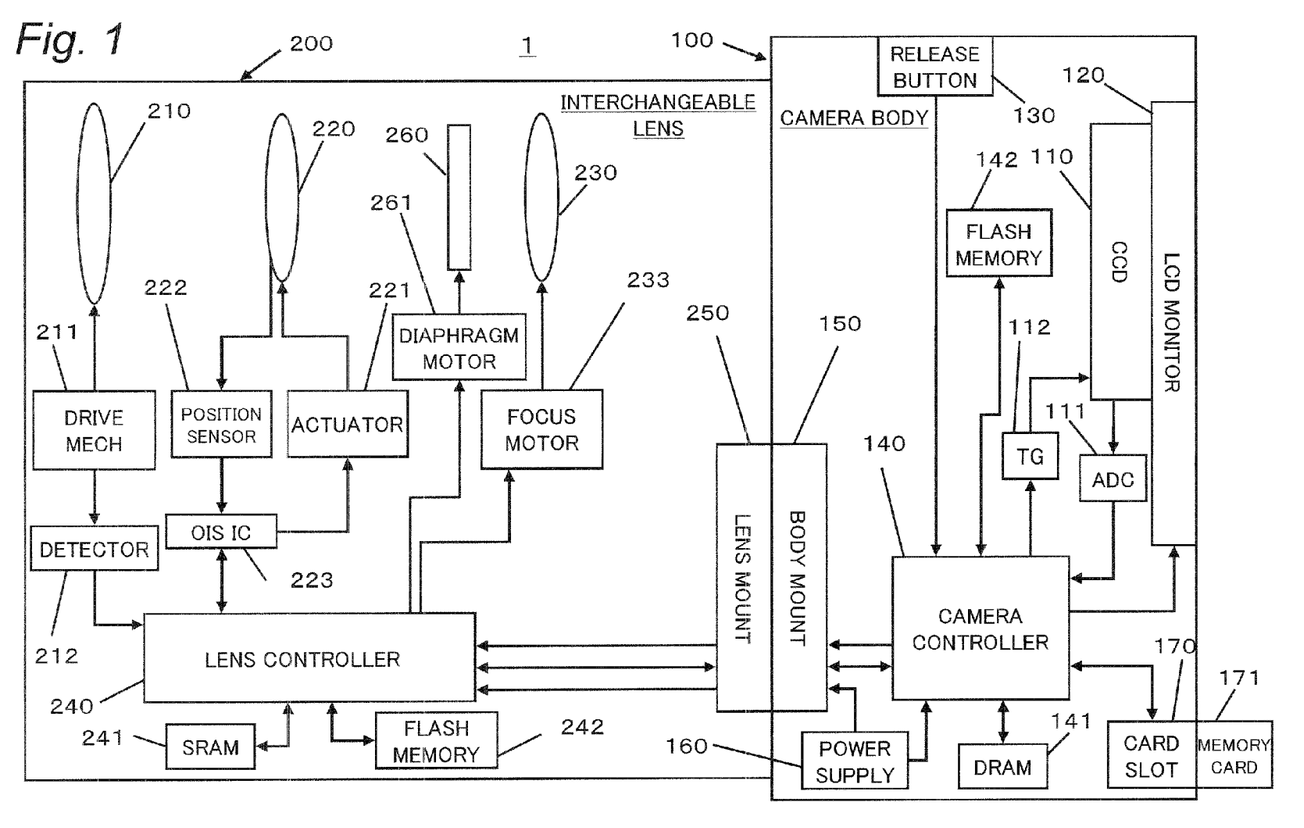
FIG. 1 is a block diagram of a camera system in first and second embodiments.

FIG. 1 is a block diagram showing a configuration of a camera system in a first embodiment. A camera system 1 is composed of a camera body 100 and an interchangeable lens 200 mountable to the camera body 100. The camera system 1 can perform a contrast type autofocus operation based on image data generated by a CCD image sensor 110.

1-2. Configuration of Camera Body

The camera body 100 includes a CCD image sensor 110, a liquid crystal display monitor 120, a camera controller 140, a body mount 150, a power supply 160, and a card slot 170.

The camera controller 140 controls the overall operation of the camera system 1 by controlling components such as the CCD image sensor 110 in response to an instruction from an operating member such as a release button 130. The camera controller 140 sends a vertical synchronizing signal to a timing generator 112. In parallel with this, the camera controller 140 generates an exposure synchronizing signal. The camera controller 140 periodically sends the generated exposure synchronizing signal to a lens controller 240 through the body mount 150 and a lens mount 250. The camera controller 140 uses a DRAM 141 as a working memory when performing a control operation and an image processing operation.

The CCD image sensor 110 captures a subject image incident thereon through the interchangeable lens 200 to generate image data. The generated image data is digitized by an AD converter 111. The image data digitized by the AD converter 111 is subjected to predetermined image processing by the camera controller 140. The predetermined image processing includes, for example, a gamma correction process, a white balance correction process, a flaw correction process, a YC conversion process, an electronic zoom process, and a JPEG compression process.

The CCD image sensor 110 operates at timing that is controlled by the timing generator 112. The operations of the CCD image sensor 110 include a still image capturing operation, a through image capturing operation, and so on. A through image is mainly a moving image and is displayed on the liquid crystal display monitor 120 in order for a user to determine a composition for capturing a still image.

The liquid crystal display monitor 120 displays an image represented by display image data which is subjected to image processing by the camera controller 140. The liquid crystal display monitor 120 can selectively display a moving image or a still image.

The card slot 170 allows a memory card 171 to be inserted thereinto, and controls the memory card 171 based on control from the camera controller 140. The memory card 171 can store image data generated by image processing performed by the camera controller 140. For example, the memory card 171 can store JPEG image files. In addition, image data or an image file stored in the memory card 171 can be read and the image data or image file read from the memory card 171 is subjected to image processing by the camera controller 140. For example, the camera controller 140 decompresses image data or an image file obtained from the memory card 171 and thereby generates display image data.

The power supply 160 supplies power to be consumed by the camera system 1. The power supply 160 may be, for example, a dry battery or a rechargeable battery. Alternatively, the power supply 160 may supply power to the camera system 1 from an external source through a power cord.

The body mount 150 is mechanically and electrically connectable to the lens mount 250 of the interchangeable lens 200. The body mount 150 can send and receive data to/from the interchangeable lens 200 through the lens mount 250. The body mount 150 sends an exposure synchronizing signal received from the camera controller 140, to the lens controller 240 through the lens mount 250. In addition, the body mount 150 sends other control signals received from the camera controller 140, to the lens controller 240 through the lens mount 250. For example, the body mount 150 sends information about the drive of a focus lens 230 received from the camera controller 140, to the lens controller 240 through the lens mount 250. In addition, the body mount 150 sends signals received from the lens controller 240 through the lens mount 250, to the camera controller 140. In addition, the body mount 150 supplies power received from the power supply 160, to the entire interchangeable lens 200 through the lens mount 250.

1-3. Configuration of Interchangeable Lens

The interchangeable lens 200 includes an optical system, the lens controller 240, and the lens mount 250. The optical system includes a zoom lens 210, an OIS lens 220, a diaphragm 260, and the focus lens 230.

The zoom lens 210 is a lens for changing the magnification of a subject image formed by the optical system. The zoom lens 210 consists of one or a plurality of lenses. A drive mechanism 211 includes a zoom ring which is operable by the user, etc. The drive mechanism 211 informs the zoom lens 210 of an operation performed by the user and allows the zoom lens 210 to move in an optical axis direction of the optical system. A detector 212 detects an amount of drive of the drive mechanism 211. The lens controller 240 can grasp the zoom magnification of the optical system by obtaining a result of the detection by the detector 212.

The OIS lens 220 is a lens for correcting a shake of a subject image formed by the optical system of the interchangeable lens 200. The OIS lens 220 reduces a shake of a subject image on the CCD image sensor 110 by moving in a direction in which shake of the camera system 1 is compensated for. The OIS lens 220 consists of one or a plurality of lenses. An actuator 221 drives the OIS lens 220 in a plane perpendicular to an optical axis of the optical system, in response to control from an OIS IC 223. The actuator 221 can be implemented by, for example, a magnet and a planar coil. A position detection sensor 222 is a sensor that detects a position of the OIS lens 220 in the plane perpendicular to the optical axis of the optical system. The position detection sensor 222 can be implemented by, for example, a magnet and a Hall element. The OIS IC 223 controls the actuator 221 based on a result of detection by the position detection sensor 222 and a result of detection by a camera shake sensor such as a gyro sensor. The OIS IC 223 obtains a result of detection by the camera shake sensor from the lens controller 240. In addition, the OIS IC 223 sends a signal indicating a state of an optical image shake correction process, to the lens controller 240.

The diaphragm 260 is a member for regulating the amount of light passing through the optical system. The diaphragm 260 consists of, for example, a plurality of diaphragm blades, and can regulate the amount of light by opening and closing an opening formed by the blades. A diaphragm motor 261 is a driver for opening and closing the opening of the diaphragm 260.

The focus lens 230 is a lens for changing the focus state of a subject image formed on the CCD image sensor 110 by the optical system. The focus lens 230 consists of one or a plurality of lenses.

A focus motor 233 drives the focus lens 230 to move back and forth along the optical axis of the optical system, based on control by the lens controller 240. By this, the focus state of a subject image formed on the CCD image sensor 110 through the optical system can be changed. In the present embodiment, for the focus motor 233, a stepping motor can be used. Note, however, that the motor is not limited thereto and the focus motor 233 can also be implemented by a DC motor, a servomotor, an ultrasonic motor, etc.

The lens controller 240 controls the entire interchangeable lens 200 by controlling the OIS IC 223, the focus motor 233, and so on, based on control signals from the camera controller 140. For example, the lens controller 240 controls the focus motor 233 to move the focus lens 230 back and forth along the optical axis by a predetermined drive method, based on a control signal from the camera controller 140. In addition, the lens controller 240 can perform wobbling control of the focus lens 230 in synchronization with an exposure synchronizing signal from the camera controller 140. Here, the wobbling control of the focus lens 230 means minutely driving the focus lens 230 back and forth along the optical axis. The minute back and forth driving is performed in a predetermined cycle. The wobbling operation of the focus lens 230 allows a subject to be continuously brought into focus. In addition, the lens controller 240 receives signals from the detector 212, the OIS IC 223, and so on, and sends the signals to the camera controller 140. Data communication between the lens controller 240 and the camera controller 140 is performed through the lens mount 250 and the body mount 150.

The lens controller 240 uses a DRAM 241 as a working memory when performing control. A flash memory 242 stores a program and parameters used for control by the lens controller 240.

The camera controller 140 is an example of a synchronizing signal generator. The body mount 150 is an example of a sending unit. The camera controller 140 is an example of a body controller. The lens mount 250 is an example of a receiving unit. The lens controller 240 is an example of a lens controller. The CCD image sensor 110 is an example of an imaging unit.

2. Operations

The operations of the camera system configured in the above-described manner will be described using FIGS. 2 to 4.

2-1. Example of Operation of Camera System

In the camera system of the present embodiment, the interchangeable lens 200 has a synchronous mode in which the interchangeable lens 200 operates in synchronization with a synchronizing signal (exposure synchronizing signal) received from the camera body 100, and an asynchronous mode in which the interchangeable lens 200 operates in synchronization with a synchronizing signal generated within the interchangeable lens 200 instead of the synchronizing signal sent from the camera body 100. In the synchronous mode, the camera body 100 outputs the synchronizing signal to the interchangeable lens 200. In the asynchronous mode, the camera body 100 stops outputting the synchronizing signal to the interchangeable lens 200. Switching between the synchronous mode and asynchronous mode of the interchangeable lens 200 is controlled by the camera controller 140 according to a control state of the camera body 100. For example, the interchangeable lens 200 is controlled to the synchronous mode during a through image display operation and during moving image shooting, while it is controlled to the asynchronous mode during the activation of the camera system, during image playback, and during still image shooting.

Figure 2:
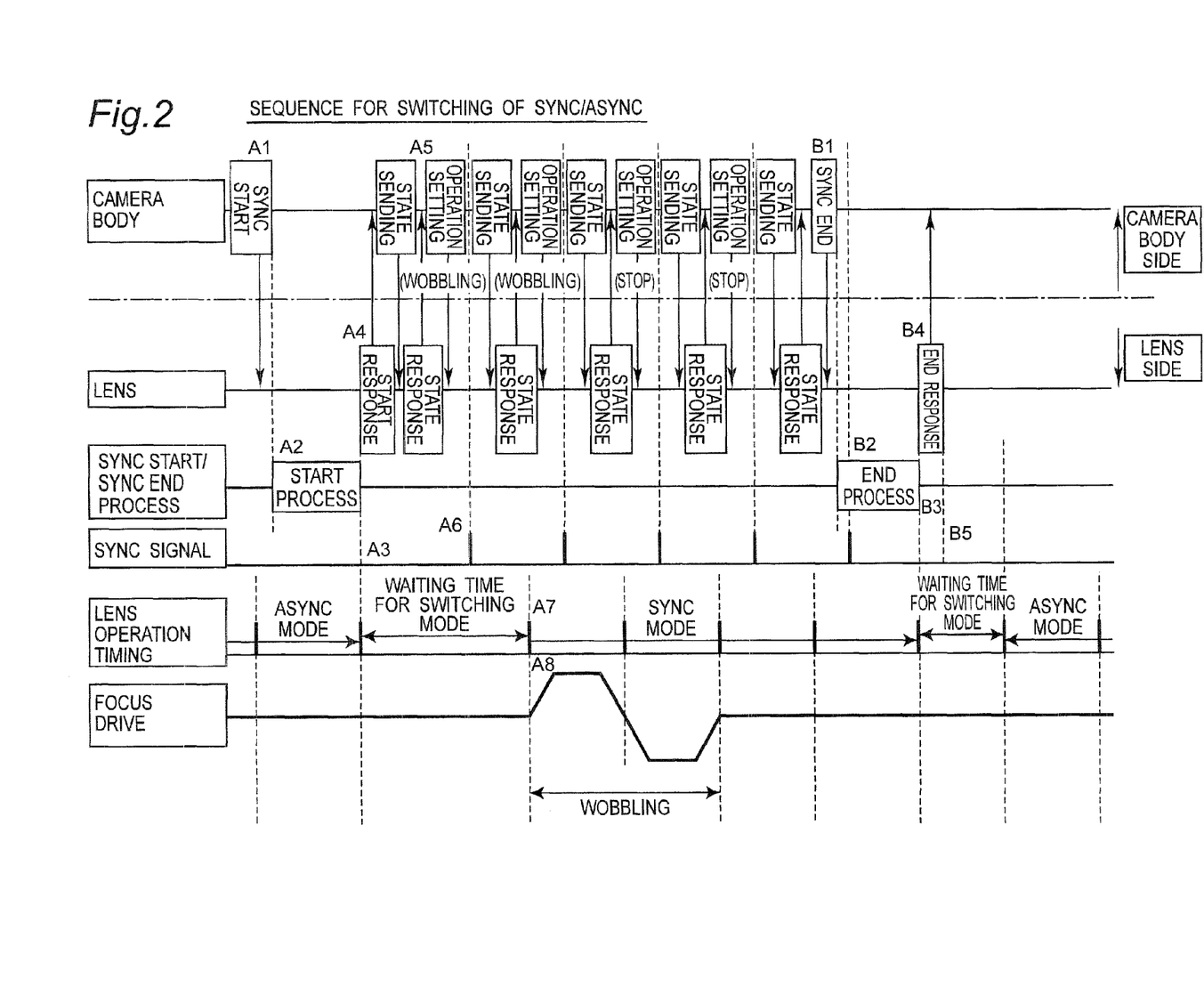
FIG. 2 is a diagram describing a switching sequence between a synchronous mode and an asynchronous mode in the first embodiment.

With reference to FIG. 2, switching between the synchronous mode and the asynchronous mode in the interchangeable lens 200 will be described.

First, an operation to start synchronization will be described. The camera body 100 sends a synchronization start command to set the interchangeable lens 200 to the synchronous mode, to the interchangeable lens 200 (A1). In response to the synchronization start command, the interchangeable lens 200 performs a synchronization start process (A2). The synchronization start process includes a process for providing a notification to each of processing units so as to adjust, by the lens controller 240, the drive frequency of the interchangeable lens 200 to a frequency instructed by the camera controller 140. The synchronization start process includes a process of providing a notification to each processing unit so as to complete a remaining process that needs to be driven during asynchronization, and a process of providing a notification to each processing unit so as to support a frequency to be changed. When the interchangeable lens 200 detects that such notifications have been provided, the interchangeable lens 200 terminates an asynchronous state (A3). Thereafter, the interchangeable lens 200 enters a state which waits for mode switching. The mode switching wait state is provided in order for each processing unit of the interchangeable lens 200 to perform the process for completing a remaining process and the process for supporting a new frequency (changed frequency). Note that, when the interchangeable lens 200 terminates the asynchronous state, the interchangeable lens 200 sends a start command response to the camera body 100 (A4). When the camera body 100 receives the start command response, the camera body 100 starts communication in the synchronous mode (A5). Specifically, the camera body 100 sends a command to request for information on the state of the interchangeable lens 200, the interchangeable lens 200 (A5). The interchangeable lens 200 sends information on the state of the interchangeable lens 200 to the camera body 100. In addition, the camera body 100 sends an operation setting command to instruct control performed in the synchronous mode, to the interchangeable lens 200. After sending the operation setting command, the camera body 100 sends a synchronizing signal (A6). The interchangeable lens 200 starts a synchronous operation after a lapse of a predetermined delay time (A7). At this time, the interchangeable lens 200 performs focus drive (e.g., wobbling) instructed by the camera body 100 with the operation setting command (A8).

Next, an operation to end synchronization will be described. The camera body 100 sends a synchronization end command to end the synchronous mode, to the interchangeable lens 200 (B1). In response to the synchronization end command, the interchangeable lens 200 performs a synchronization end process (B2). The synchronization end process includes a process of providing notification to each processing unit so as to adjust the drive frequency of the lens controller 240 to a frequency convenient for the interchangeable lens 200. For example, when it is predetermined that the control frequency of the interchangeable lens 200 set by the lens controller 240 is 120 Hz, the synchronization end process includes a process of providing notification to each processing unit to adjust the drive frequency of the lens controller 240 to 120 Hz. The synchronization end process has the same operation as those in the above-described synchronization start process. When the interchangeable lens 200 confirms the completion of the synchronization end process, the interchangeable lens 200 ends the synchronous mode (B3). The interchangeable lens 200 sends an end command response to the camera body 100 (B4). Thereafter, the interchangeable lens 200 enters a mode switching wait state. In the mode switching wait state, the lens controller 240 adjusts the drive frequency to a frequency convenient for the interchangeable lens 200. The camera body 100 stops outputting the synchronizing signal (B5) and the interchangeable lens 200 transitions to the asynchronous mode.

In the above-described manner, the synchronous mode and the asynchronous mode between the camera body 100 and the interchangeable lens 200 are switched by a synchronization start command and a synchronization end command.

Note that, in the camera system 1 according to the present embodiment, in a start process and an end process an instruction for each process is only "notified" to the interchangeable lens 200 from the camera body 100, and an actual process is performed during the "mode switching wait time". However, the configuration does not necessarily need to be like this. The configuration may be such that in a start process and an end process the "notification" and "process" of an instruction for each process are performed and "mode switching wait time" is not provided.

Figure 3:
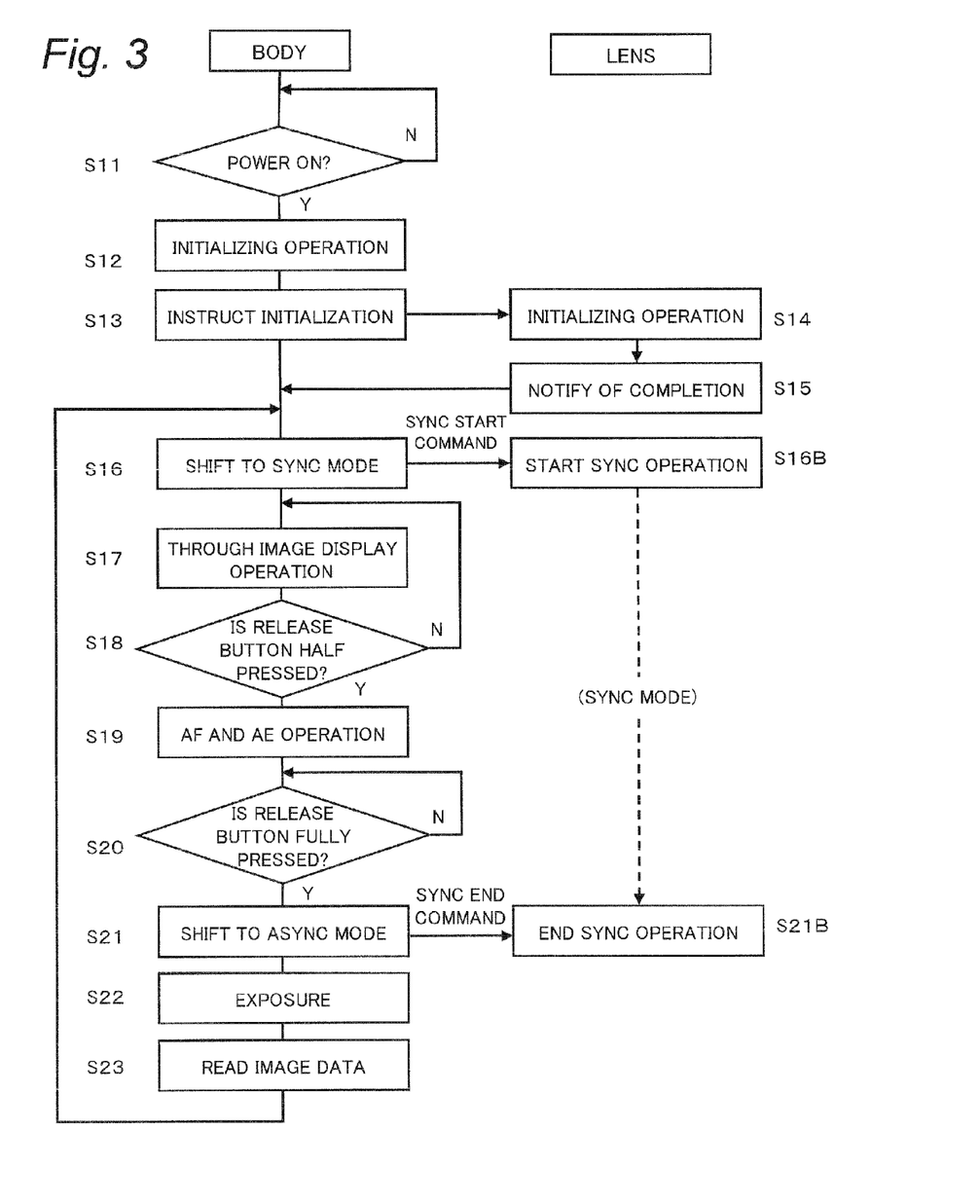
FIG. 3 is a flowchart of switching operations between the synchronous mode and the asynchronous mode.
Figure 4:
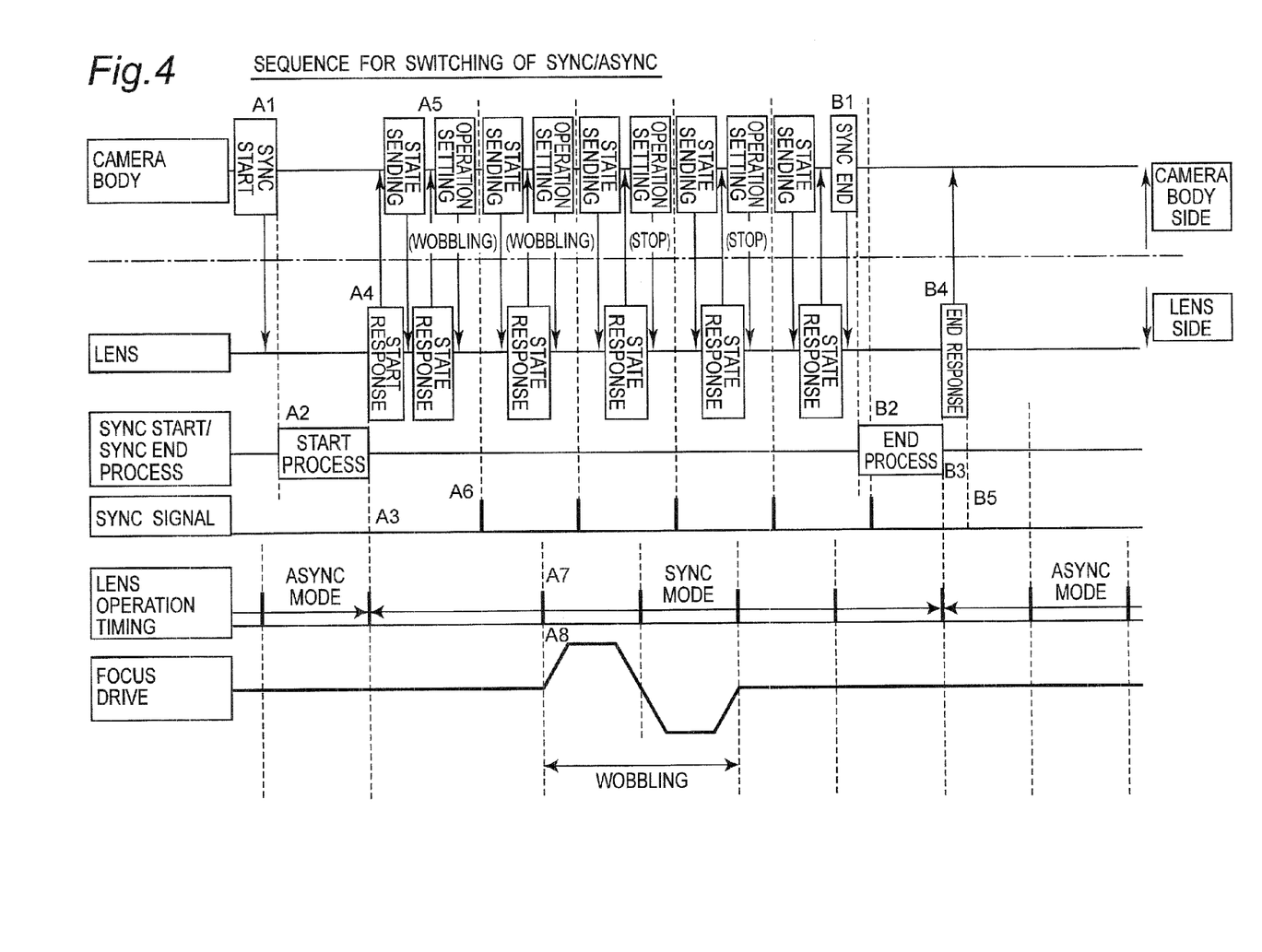
FIG. 4 is a diagram describing a switching sequence between the synchronous mode and the asynchronous mode in the second embodiment.

FIG. 3 is a flowchart showing an exemplary operation of the camera system related to a switching operation between the aforementioned synchronous mode and asynchronous mode. With reference to the flowchart in FIG. 3, the operations of the camera controller 140 and the lens controller 240 in a switching operation between the synchronous mode and the asynchronous mode will be described.

With the camera system being powered off, if the power is switched to on by an operation by the user, and the like (S11), the camera controller 140 starts an initialization operation in the camera body 100 (S12) and instructs the interchangeable lens 200 to start an initialization operation (S13).

The lens controller 240 receives the instruction from the camera controller 140 and performs an initialization operation in the interchangeable lens 200 (S14). The initialization operation in the interchangeable lens 200 includes various operations that include, for example, measuring an origin of the operation of the focus motor 233, checking a value of a counter 243, and loading a program stored in the flash memory 242 into the DRAM 241. When the initialization operation in the interchangeable lens 200 is completed, the lens controller 240 notifies the camera controller 140 of the completion (S15).

When the initialization operation of the camera body 100 is completed and an initialization operation completion notification is received from the lens controller 240, the camera controller 140 shifts from the asynchronous mode to the synchronous mode (S16). When the camera controller 140 has shifted from the asynchronous mode to the synchronous mode, the camera controller 140 sends a synchronization start command to the lens controller 240. When the lens controller 240 receives the synchronization start command, the lens controller 240 shifts from the asynchronous mode to the synchronous mode and performs a control operation in synchronization with a synchronizing signal received from the camera controller 140 (S16B). For example, the lens controller 240 grasps drive states of the focus motor 233 and the diaphragm motor 261 in synchronization with the synchronizing signal and sends results thereof to the camera controller 140.

Thereafter, the camera controller 140 shifts to an operation to generate and display a through-image (S17). By thus performing a through-image generation and display operation after shifting to the synchronous mode, the camera controller 140 can properly grasp position information of the focus lens 230, an aperture value of the diaphragm 260, and the like, at predetermined timing. As a result, the camera system 1 can perform AF control and AE control more accurately. Note that the through-image display operation will be described in detail below.

During a period in which the generated through image is displayed on the liquid crystal display monitor 120, the camera controller 140 monitors whether the release button 130 is half-pressed (S18). If a half-press operation of the release button 130 is performed, then the camera controller 140 performs an autofocus operation and an automatic exposure control operation (S19). When those operations are completed, it is monitored whether a full-press operation of the release button 130 is performed (S20).

If a full-press operation of the release button 130 is performed, then the camera controller 140 shifts from the synchronous mode to the asynchronous mode (S21). When the camera controller 140 shifts from the synchronous mode to the asynchronous mode, the camera controller 140 sends a synchronization end command to the lens controller 240. When the lens controller 240 receives the synchronization end command, the lens controller 240 shifts to the asynchronous mode (S21B).

Thereafter, the CCD image sensor 110 performs exposure (S22). The camera controller 140 reads image data generated by the exposure from the CCD image sensor 110 and performs image processing on the image data (S23). When the reading of image data is completed and the generated image data is stored in the memory card 171, the control returns to step S16 and the camera controller 140 shifts to the synchronous mode. The reason why the camera controller 140 thus shifts to the asynchronous mode upon the start of capturing an image (upon full-press of the release button 130) is because during a period from when image data is captured until the image data is recorded in the memory card 171 the camera controller 140 only needs to control each processing unit in the camera body 100 (processing of the captured image data and recording of the image data in the memory card 171) and does not need to synchronize with the lens controller 240. Accordingly, the camera controller 140 can concentrate on processes in the camera body 100.

Note that when image data stored in the memory card 171 is reproduced and displayed on the liquid crystal display monitor 120, the camera controller 140 and the lens controller 240 are driven in the asynchronous mode. This is because upon a reproduction operation the camera controller 140 only needs to control each of processing units provided in the camera body 100 and does not need to control the processing units in the lens controller 240, and thus the camera controller 140 does not particularly need to synchronize with the lens controller 240. By not synchronizing with the lens controller 240 upon reproduction, the camera controller 140 can concentrate on the reproduction of image data. As a result, the camera controller 140 can perform an image data reproduction process at high speed. In addition, by driving in the asynchronous mode during reproduction, the CCD image sensor 110 can be turned off during the reproduction. This is because, since the camera controller 140 and the lens controller 240 are driven in the asynchronous mode, the camera controller 140 does not need to send a synchronizing signal to the lens controller 240. Therefore, since the CCD image sensor 110 is turned off during reproduction of image data, and the like, power saving can be achieved.

As described above, in the camera system of the present embodiment, when a full-press operation of the release button 130 is performed, the camera controller 140 shifts from the synchronous mode to the asynchronous mode. Therefore, when the camera controller 140 processes the captured image data, records the image data in the memory card 171, and the like, the camera body 100 and the interchangeable lens 200 are not particularly synchronized. Accordingly, the camera controller 140 can concentrate on a process of image data and recording of the image data in the memory card 171. As a result, the camera controller 140 can perform a process of image data and recording of the image data in the memory card 171 at high speed.

In the camera system according to the present embodiment, when image data recorded in the memory card 171 is reproduced, the camera controller 140 operates in the asynchronous mode. Therefore the camera controller 140 can concentrate on the reproduction of image data. As a result, the camera controller 140 can perform an image data reproduction process at high speed.

As described above, in the camera system of the present embodiment, the camera controller 140 switches between the synchronous mode and the asynchronous mode by notifying the lens controller 240 of a command. By this arrangement, control is performed in the asynchronous mode when synchronization is not necessary, enabling to simplify the control of the camera system.

2-2. Operations in Synchronous Mode

In the synchronous mode, the interchangeable lens 200 performs various operations in synchronization with a synchronizing signal obtained from the camera body 100. For example, the interchangeable lens 200 performs drive control of the focus lens 230, the diaphragm 260, and the zoom lens 210 in synchronization with a synchronizing signal indicating an exposure period of the CCD image sensor 110. Such operations will be described below.

In the camera system of the present embodiment, the camera controller 140 transmits a synchronizing signal at a frequency of 60 Hz to the lens controller 240.

Every time the synchronizing signal is obtained, the lens controller 240 obtains an F value. The lens controller 240 can perform drive control of the diaphragm 260 according to the obtained F value.

In addition, every time the synchronizing signal is obtained, the lens controller 240 obtains position information of the zoom lens 210.

In addition, every time the synchronizing signal is obtaining, the lens controller 240 notifies the camera controller 140 of information indicating a camera shake state. The camera controller 140 can perform various controls taking into account the camera shake state, based on the obtained information indicating the camera shake state.

As described above, in the synchronous mode, the controls, by the lens controller 240, of the diaphragm 260, the zoom lens 210, the OIS lens 220, and so on is performed in synchronization with a synchronizing signal obtained by the lens controller 240 from the camera controller 140, and at 60 Hz which is the same frequency as that of the synchronizing signal.

3. Summary

A camera system according to the present embodiment is a camera system including the camera body 100 and the interchangeable lens 200. The camera body 100 includes the camera controller 140 that generates a synchronizing signal, the body mount 150 that sends the generated synchronizing signal to the interchangeable lens 200, the camera controller 140 that controls the camera body 100, and the camera controller 140 that generates a command to control the interchangeable lens 200 to a synchronous mode (the interchangeable lens 200 is controlled in synchronization with the synchronizing signal) or an asynchronous mode (the interchangeable lens 200 is controlled in asynchronization with the synchronizing signal) according to a control mode set by the camera controller 140. The interchangeable lens 200 includes the lens mount 250 that receives the synchronizing signal and the command which are sent from the camera body 100, and the lens controller 240 that controls the interchangeable lens 200 in the synchronous mode or the asynchronous mode according to the received command.

By the above-described configuration, when synchronization is not required, control can be performed in the asynchronous mode. Therefore, the camera controller 140 can concentrate on the control of the camera body 100 without taking into account synchronization with the interchangeable lens 200. In addition, the lens controller 240 does not suffer more restrictions than necessary to synchronize with the camera body 100.

In addition, in the present embodiment, the camera controller 140 may send a command to instruct the interchangeable lens 200 to operate in the synchronous mode during moving image capturing while sending a command to instruct the interchangeable lens 200 to operate in the asynchronous mode during still image capturing. During moving image capturing, wobbling control for an autofocus operation needs to be performed and thus the interchangeable lens 200 needs to operate in the synchronous mode. On the other hand, when still image capturing is performed by a full-press operation of the release button, there is no need to perform wobbling control for an autofocus operation, and thus the interchangeable lens 200 does not need to operate in the synchronous mode. Thus, during still image capturing, by operating the interchangeable lens 200 in the asynchronous mode, the camera controller 140 can concentrate on control in the camera body 100.

In addition, in the present embodiment, when the camera controller 140 performs control such that image data generated by the COD image sensor 110 is not fed to a processing unit provided at a stage subsequent to the CCD image sensor 110 (e.g., when there is no need to generate a through image or during image playback), the camera controller 140 may control the interchangeable lens 200 to be asynchronous.

When the camera controller 140 does not input image data, there is no need to achieve synchronization between the CCD image sensor 110 and the interchangeable lens 200. In such a case, by controlling the interchangeable lens 200 to be asynchronous, the load on the camera controller 140 can be reduced.

Second Embodiment

In the first embodiment, as shown in FIG. 2, the "mode switching wait time" is provided between the synchronous mode and the asynchronous mode. In the present embodiment, control will be described for achieving smooth switching from the synchronous mode to the asynchronous mode when the "mode switching wait time" is not provided between the synchronous mode and the asynchronous mode, as shown in FIG. 4. In the present embodiment, those processes performed during the mode switching wait time in the first embodiment are performed in a "start process" or an "end process". The configuration and operations of a camera system 1 are basically the same as those in the first embodiment. The operations of the camera system 1 specific to the present embodiment will be described below.

In an interchangeable lens 200, during the synchronous mode, control is performed based on a synchronizing signal from a camera body 100, and during the asynchronous mode, control is performed based on a timing signal generated in the interchangeable lens 200. Thus, when the mode is switched from the synchronous mode to the asynchronous mode, a reference signal that provides control timing is changed and accordingly a control period thereof is also changed. Such change in the reference signal that provides the control timing may cause a malfunction.

Figure 5:
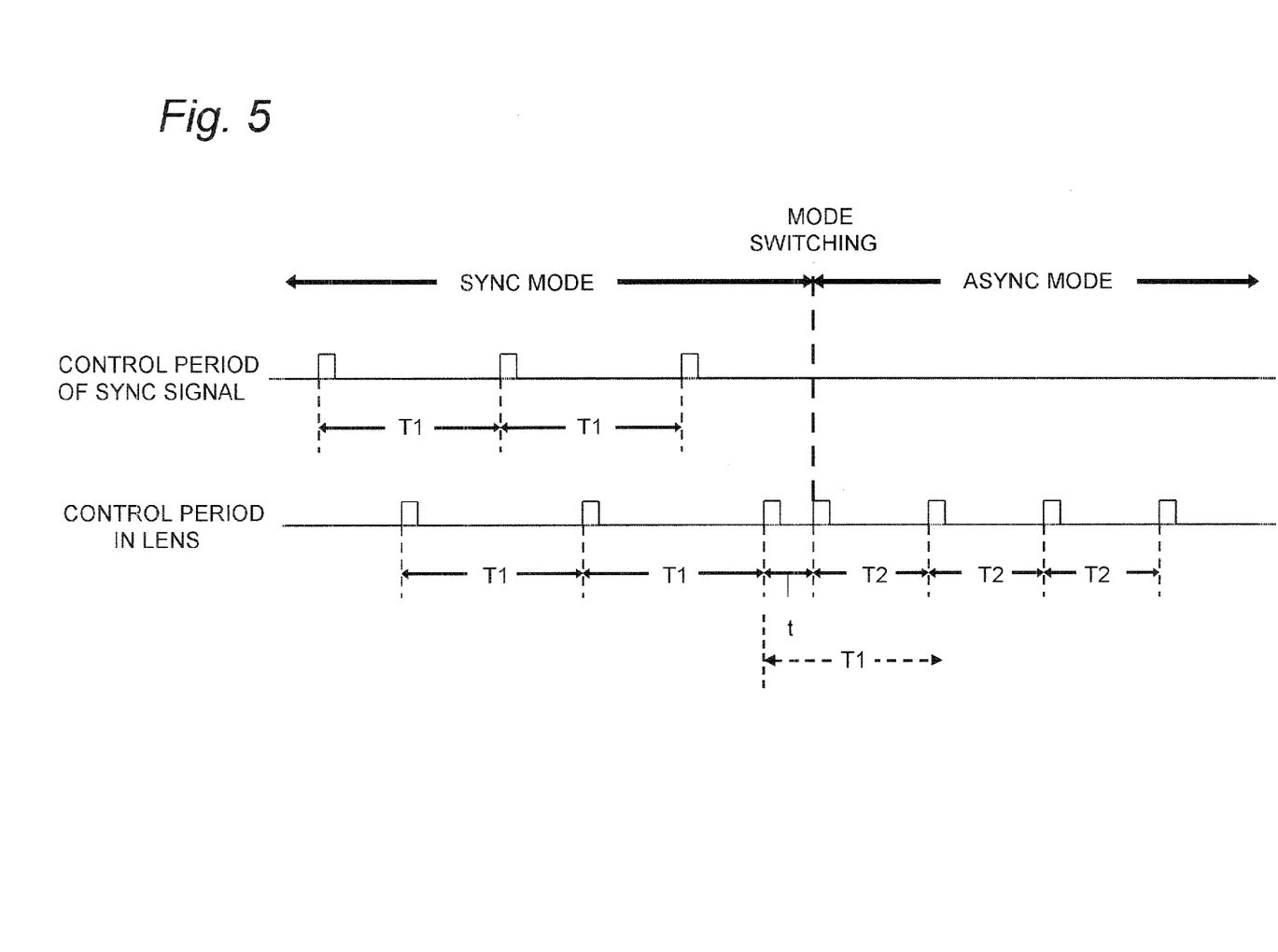
FIG. 5 is a diagram describing a problem arising when switching from the synchronous mode to the asynchronous mode is performed.

For example, as shown in FIG. 5, when switching the mode from the synchronous mode to the asynchronous mode without providing a switching wait time as in the present embodiment, a duration of a control period t smaller than a control period T1 in the synchronous mode occurs. In this case, a process which is set for a control period T1 before the switching needs to be completed during the shorter control period t. For this purpose, the operating speed of an actuator (e.g., a motor) needs to be increased. However, if the operating speed of the actuator is set to be higher, then the actuator may not be able to follow the high speed, causing a loss of synchronization.

Figure 6:
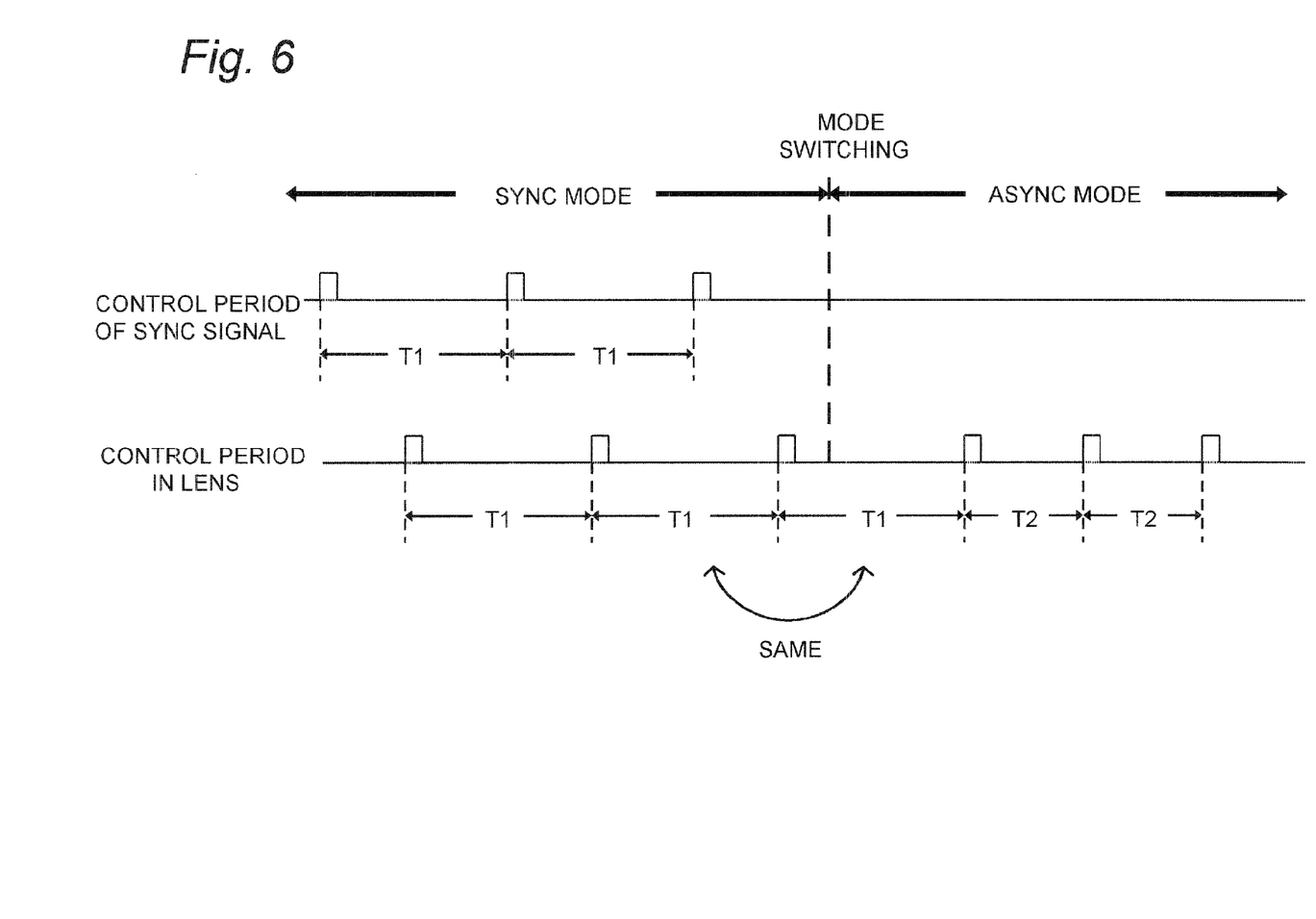
FIG. 6 is a diagram describing switching of control periods for when switching from the synchronous mode to the asynchronous mode is performed in the second embodiment.

In view of this, in the present embodiment, when switching the mode from the synchronous mode to the asynchronous mode, instead of immediately switching control periods, the control period is adjusted such that the control period is switched to a control period T2 in the interchangeable lens 200 after a lapse of the control period T1 before the switching. With reference to FIG. 6, such an operation will be described in detail.

In the synchronous mode, a lens controller 240 counts a length (T1) of a control period every control period and stores the length (T1) of a control period in a DRAM 241. When switching the mode from the synchronous mode to the asynchronous mode, the lens controller 240 switches the length of a control period to the control period 12 of the interchangeable lens 200 for the asynchronous mode when the length (T1) of a control period before the switching, elapses after the mode is switched. Specifically, when switching the mode from the synchronous mode to the asynchronous mode, the length of a control period including a switching point in time is set to be the same length (T1) as that of the control period in the synchronous mode.

By this arrangement, a control period immediately after the mode switching is the same as the control period for the synchronous mode. Hence, a process to be performed during the last period in the synchronous mode can be accomplished immediately after the mode is switched.

Other Embodiments

Although in the camera system 1 of the above-described embodiments the camera controller 140 sends the lens controller 240 a synchronizing signal at a frequency of 60 Hz, the configuration is not necessarily limited thereto. The camera controller 140 may send the lens controller 240 a synchronizing signal at a frequency of 30 Hz or send the lens controller 240 a synchronizing signal at a frequency of 15 Hz. Namely, a synchronizing signal of any frequency may be sent.

In the camera system 1 of the above-described embodiments, the lens controller 240 controls each processing unit at 120 Hz in the asynchronous mode. However, the configuration does not necessarily need to be like this. For example, the lens controller 240 may control each processing unit at 60 Hz in the asynchronous mode or may control each processing unit at 30 Hz. In addition, the lens controller 240 does not need to perform control of each processing unit at a constant frequency of 120 Hz, and may perform control at different frequencies for different processing units and different processing contents.

In the camera system 1 of the above-described embodiments, the camera controller 140 sends a synchronizing signal to the lens controller 240 in the synchronous mode, and does not send a synchronizing signal to the lens controller 240 in the asynchronous mode. However, the configuration does not necessarily need to be like this. For example, the configuration may be such that the camera controller 140 sends a synchronizing signal to the lens controller 240 in both modes, the synchronous mode and the asynchronous mode, and the lens controller 240 achieves synchronization with the synchronizing signal in the synchronous mode but does not achieve synchronization with the synchronizing signal in the asynchronous mode.

Although in the above-described embodiments a configuration including the zoom lens 210 and the OIS lens 220 is exemplified, they are not essential components for the present invention. Specifically, the present invention is also applicable to a camera system in which a fixed focal length lens with no zoom function is mounted, and the present invention is also applicable to a camera system in which an interchangeable lens with no camera shake correction function is mounted.

Although in the above-described embodiments a camera body that does not include a movable mirror is exemplified, the present invention is not limited thereto. For example, a movable mirror may be included in the camera body, or a prism for splitting a subject image may be included in the camera body. Alternatively, the configuration may be such that a movable mirror is included in an adapter instead of in the camera body.

Although in the above-described embodiments the CCD image sensor 110 is exemplified as an imaging device, the present invention is not limited thereto. For example, the imaging device may be configured by a CMOS image sensor or an NMOS image sensor.

INDUSTRIAL APPLICABILITY

The present invention is applicable to a lens interchangeable type camera system in which communication is performed between an interchangeable lens and a camera body (specifically, a digital still camera, a digital movie camera, and the like).

Although the above description has been made of particular embodiments, many other variants and modifications and other uses will become apparent to those skilled in the art. Therefore, the embodiments are not limited to the specific disclosure herein and will be limited only by the appended claims. Note that this application is related to Japanese Patent Applications, Japanese Patent Application No. 2008-141929 (filed May 30, 2008) and Japanese Patent Application No. 2008-145687 (filed Jun. 3, 2008), and U.S. Provisional Patent Application No. 61/053,815 (filed May 16, 2008), the contents of which are incorporated herein by reference.

DESCRIPTION OF REFERENCE SIGNS

100: CAMERA BODY
110: CCD IMAGE SENSOR
111: AD CONVERTER
112: TIMING GENERATOR
120: LIQUID CRYSTAL DISPLAY MONITOR
130: RELEASE BUTTON
140: CAMERA CONTROLLER

141: DRAM
150: BODY MOUNT
160: POWER SUPPLY
170: CARD SLOT
171: MEMORY CARD
200: INTERCHANGEABLE LENS
210: ZOOM LENS
211: DRIVE MECHANISM
212: DETECTOR
220: OIS LENS
221: ACTUATOR
222: POSITION DETECTION SENSOR
223: OIS IC
230: FOCUS LENS
233: FOCUS MOTOR
240: LENS CONTROLLER
241: DRAM
242: FLASH MEMORY
243: COUNTER
250: LENS MOUNT
260: DIAPHRAGM
261: DIAPHRAGM MOTOR

The invention claimed is:

1. A camera system comprising a camera body and an interchangeable lens, wherein
the camera body comprises:
an imaging unit;
a synchronizing signal generator that generates a synchronizing signal;
a body controller that controls the camera body and generates a command to control the interchangeable lens; and
a sending unit that sends the synchronizing signal and the command,
the sending unit sends the synchronizing signal at a timing correlated with an exposure timing of the imaging unit,
the body controller performs control to send the interchangeable lens a command to set the interchangeable lens to a synchronous mode in which operation of the interchangeable lens is controlled in synchronization with the synchronizing signal generated in the camera body, and a command to set the interchangeable lens to an asynchronous mode in which the operation of the interchangeable lens is controlled in synchronization with a synchronizing signal generated in the interchangeable lens, and
the interchangeable lens comprises:
an optical system;
a receiving unit that receives a synchronizing signal and a command which are sent from the camera body; and
a lens controller that controls the operation of the interchangeable lens,
the lens controller controls the operation of the optical system in synchronization with the synchronizing signal received from the camera body in the synchronous mode, or the synchronizing signal generated in the interchangeable lens in the asynchronous mode, according to the command received from the camera body,
the synchronizing signal generated in the camera body is generated based on an exposure timing of the imaging unit in the camera body,
the synchronizing signal generated in the camera body is sent from the camera body to the interchangeable lens, and
the synchronizing signal generated in the camera body is used for driving the optical system in the interchangeable lens in the synchronous mode.

2. The camera system according to claim 1, wherein the body controller controls the interchangeable lens to the synchronous mode during capturing a moving image.

3. The camera system according to claim 2, wherein the body controller controls the interchangeable lens to the asynchronous mode during capturing a still image.

4. The camera system according to claim 1, wherein
the body controller controls the interchangeable lens to the asynchronous mode when image data generated by the imaging unit is not fed to a processing unit at a stage subsequent to the imaging unit.

5. The camera system according to claim 1, wherein
the synchronous mode has a first control period and the asynchronous mode has a second control period, and
when switching from the synchronous mode to the asynchronous mode, the lens controller sets a length of a control period including a switching point in time such that the length of the set control period including the switching point in time is same as that of the first control period.

6. A camera body to which an interchangeable lens including an optical system is mountable, comprising:
an imaging unit;
a synchronizing signal generator that generates a synchronizing signal;
a body controller that controls the camera body and generates a command to control the interchangeable lens; and
a sending unit that sends the synchronizing signal and the command, wherein
the sending unit sends the synchronizing signal at a timing correlated with an exposure timing of the imaging unit, and
the body controller performs control to send the interchangeable lens a command to set the interchangeable lens to a synchronous mode in which operation of the interchangeable lens is controlled in synchronization with the synchronizing signal generated in the camera body, and a command to set the interchangeable lens to an asynchronous mode in which the operation of the interchangeable lens is controlled in synchronization with a synchronizing signal generated in the interchangeable lens,
the synchronizing signal generated in the camera body is generated based on the exposure timing in the camera body,
the synchronizing signal generated in the camera body is sent from the camera body to the interchangeable lens, and
the synchronizing signal generated in the camera body is used for driving the optical system in the interchangeable lens in the synchronous mode.

7. An interchangeable lens mountable to a camera body including an imaging unit, the interchangeable lens comprising:
an optical system;
a receiving unit that receives a synchronizing signal indicating a period of the exposure and a command which are sent from the camera body at a timing correlated with an exposure timing of the imaging unit; and
a lens controller that controls operation of the optical system, wherein
the lens controller controls the operation of the optical system in a synchronous mode in which operation of the interchangeable lens is controlled in synchronization with the synchronizing signal received from the camera body, or an asynchronous mode in which the operation of the interchangeable lens is controlled in synchronization with a synchronizing signal generated in the interchangeable lens, according to the command received from the camera body, the synchronizing signal received from the camera body is generated based on the exposure timing in the camera body, the synchronizing signal received from the camera body is sent from the camera body to the interchangeable lens, and the synchronizing signal received from the camera body is used for driving the optical system in the interchangeable lens in the synchronous mode.

\* \* \* \* \*